United States Patent [19]
Taylor et al.

[11] 3,761,100
[45] Sept. 25, 1973

[54] FLUID SEAL ASSEMBLY

[75] Inventors: Kenneth Roy Taylor, Glamorgan;
Stanley Wallace Tovey, Cardiff, both of Wales

[73] Assignee: Aeroquip (U.K.) Limited, Redditch, Worcestershire, England

[22] Filed: Feb. 14, 1972

[21] Appl. No.: 226,180

[30] Foreign Application Priority Data
Feb. 17, 1971 Great Britain.................... 4,850/71
June 16, 1971 Great Britain................. 28,099/71

[52] U.S. Cl. .................................. 277/65, 277/81
[51] Int. Cl. .......................................... F16j 15/34
[58] Field of Search .................. 277/38, 39, 40, 65, 277/81, 85

[56] References Cited
UNITED STATES PATENTS
2,479,968  8/1949  Schick ............................... 277/40
2,564,070  8/1951  Krug ................................... 277/38
2,857,182  10/1958  Bain et al. ........................... 277/40
3,536,333  10/1970  Gits et al. ........................... 277/38

Primary Examiner—George E. Lowrance
Assistant Examiner—Robert L. Smith
Attorney—Flynn & Frishauf

[57] ABSTRACT

A fluid face seal assembly consisting of two interfitting annular members of channel cross section, one of the members carrying the face seal and the other being for mounting the assembly. A lip seal is provided between the adjacent inner walls of the members, means are provided permitting axial relative movement of the members without relative rotation, and resilient means are provided to bias the members axially apart.

10 Claims, 2 Drawing Figures

FLUID SEAL ASSEMBLY

This invention relates to a fluid seal assembly.

SUMMARY OF THE INVENTION

In accordance with the present invention, a fluid seal assembly includes a first annular member of channel shaped cross section having a radial base, an inner axial wall formed as a lip seal, and an outer axial wall for engagement with a housing, a second annular member of channel shaped cross section having an outer wall adjacent the inner surface of the outer wall of the first member, a base remote from the base of the first member and provided with an annular face seal and an inner wall engaged by the lip seal, the assembly also including means on adjacent walls of the members cooperating to permit axial movement without rotation between the members, and resilient means mounted between the two members to bias the members apart.

Said means may comprise lugs on the inner surface of the outer wall of the first member engaging grooves in the outer wall of the second member.

Bias means may be provided to load the lip seal.

Preferably the bias means includes a garter spring or circlip.

The bias means may include a member seated on the base of the first member and having resilient fingers loading the lip seal.

The outer surface of the outer axial wall may be circumferentially corrugated.

Figure 1:
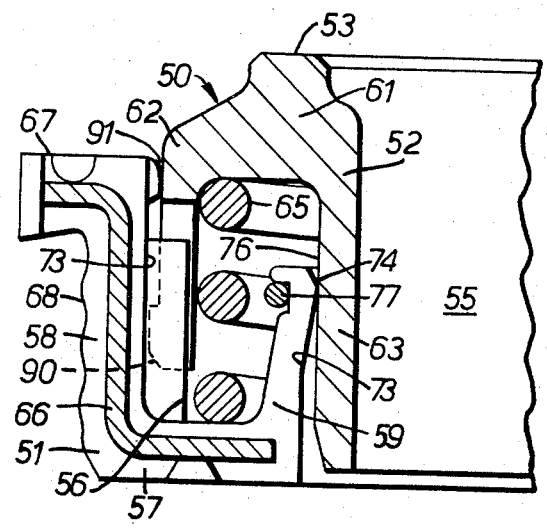
Figure 2:
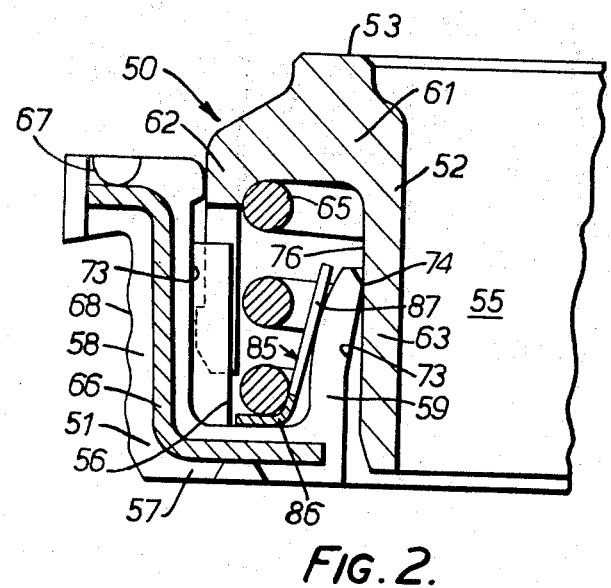

Embodiments of the present invention will now be described, by way of example, with reference to the accompanying drawings, in which:

FIG. 1 is a part sectional elevation of a first seal according to the present invention; and FIG. 2 is a part sectional elevation of a second seal according to the present invention.

Referring now to FIG. 1 of the drawings, a rotary pump seal 50 is shown in half section. The seal 50 is made of two basic members 51 and 52, the former being for location in a hole in a housing and the latter having a sealing face 53 for engagement with a relatively rotating flange or other member. The seal is annular and defines a central passage 55 for a drive shaft.

The first annular member 51 is basically channel shaped in cross section having a base 57 radially disposed with respect to the seal axis and two axial walls 58 and 59.

The second annular member 52 is also channel shaped in cross section having a radial base 61 and two axial walls 62 and 63 which are located within the inner circumferences of the walls 58 and 59 respectively, the base 61 being remote from the base 57.

Resilient means, in this embodiment a coil compression spring 65, is mounted between the bases 57 and 61 to bias the members 51 and 52 apart.

The member 51, made of elastomeric material, is provided with a rigid insert 66 in this embodiment made of metal which reinforces the base 57 and outer wall 58 of the member and also an external flange 67 provided at the end of the wall 58 remote from the base 57. The outer surface 68 of the outer wall 58 is circumferentially corrugated to ensure adequate sealing with the surface of any of a number of mounting holes which, although of the same nominal size, may vary in size because of different tolerances.

The inner surface 73 of the wall 58 is formed with equispaced lugs 56 which cooperate with recesses in the outer wall 62 of the second member 52, thus permitting axial movement without relative rotation between the members 51 and 52.

The inner surface 73 of the inner wall 59 is also formed as a lip seal 74 engaging the outer surface 76 of the inner wall 63 of the member 52. A garter spring 77 assists in suitably loading the seal 74.

The face seal 53, provided on the base 61 of the member 52 is finished flat and smooth.

In use, the seal 50 is used with a rotary pump, the member 51 being mounted in a hole in a casing with the flange 67 overlying the outer surface of the casing. The shaft of the rotary pump passes axially through the seal and carries a radial flange against which the face seal 53 abuts under the bias of the spring 65, any variation of the flange on the shaft from its nominal position being automatically compensated for by relative axial movement of the members 51 and 52. As shown in the drawing, pressure is high above the seal compared with that below, and the space between the members 51 and 52 is subjected to the high pressure. Thus the lip seal 74 is loaded against the wall 63 of the member 52 by the natural resilience of the wall 59, by the spring 77, and by the fluid pressure acting on the outer surface of the wall 59. Thus the higher the pressure of the fluid the greater the loading on the lip seal 74, thus ensuring no leakage past the seal. Of course, no leakage takes place between the face seal 53 and the shaft flange or between the number 51 and the casing. It should also be noted that the force applied to the face seal 53 is only that of the spring 54 as the equal fluid pressures above and below the member 52 act over substantially equal areas producing a minimum net force on the seal.

The embodiment illustrated in FIG. 2 is identical with that of FIG. 1 except that the garter spring 77 has been replaced by a biasing member 85 of metal or plastics material. The member 85 consists of an annular base 86 and resilient fingers 87 upstanding from the base 86 to bias the wall 59 inwardly, i.e., to load the seal 74. The base 86 is retained in position against the base 57 by the end of the spring 65 which is seated on the base 86.

Modifications may be made to the embodiments described. For example in both embodiments means may be provided to limit the outward axial movement of the members 51 and 52. This may take the form of a continuous rim 90 on the wall 62 engaging an internal lip 91 on the wall 58 (See FIG.1). This causes no problems during assembly of the seal as the rim may be readily sprung past the lips and yet holds the component parts of the seal together when the seal is not installed. Also, the garter spring of FIG. 1 may be replaced by a circlip. Moreover, instead of being mounted in a stationary body to engage a rotating flange, the seal may be mounted in the revolving impellor to engage a machined portion of the pump body or an insert in the pump body. Also it may be desirable to prevent the interior space in the seal from becoming clogged by providing a means for flushing out the interior space. This means may take the form of two diametrically opposed recesses in the lip 91.

The embodiments described may be further modified by providing the lug and recess formation between the walls 59 and 63 beneath the lip seal 74.

We claim:

1. A fluid seal assembly including a first annular member of channel shaped cross section having a radial base, an inner axial wall formed as a lip seal, and an outer axial wall for engagement with a housing, a second annular member of channel shaped cross section having an outer wall adjacent the inner surface of the outer wall of the first member, a base remote from the base of the first member and provided with an annular face seal, and an inner wall engaged by the lip seal, the assembly also including means on adjacent walls of the members cooperating to permit axial movement without rotation between the members, and resilient means mounted between the two members to bias the members apart.

2. A fluid seal assembly as claimed in claim 1, in which the first said means comprises lugs on the inner surface of the outer wall of the first member engaging grooves in the outer wall of the second member.

3. A fluid seal assembly as claimed in claim 1, in which bias means are provided to load the lip seal.

4. A fluid seal assembly as claimed in claim 3, in which the bias means comprises a garter spring.

5. A fluid seal assembly as claimed in claim 3, in which the bias means includes a member seated on the base of the first member and having resilient fingers loading the lip seal.

6. A fluid seal assembly as claimed in claim 1, in which the outer surface of the outer axial wall is circumferentially corrugated.

7. A fluid seal assembly as claimed in claim 1, including means for limiting the outward axial movement of the second member relative to the first.

8. A fluid seal assembly as claimed in claim 1, including means for flushing out the interior space between the two members.

9. A fluid seal assembly as claimed in claim 3, in which the bias means comprises a circlip.

10. A fluid seal assembly as claimed in claim 2, in which bias means are provided to load the lip seal.

* * * * *